United States Patent

Zahnen et al.

[15] 3,646,392

[45] Feb. 29, 1972

[54] TELEVISION HIGH-VOLTAGE REGULATOR CIRCUIT

[72] Inventors: Joseph G. Zahnen; George A. Kent, both of Fort Wayne, Ind.

[73] Assignee: The Magnavox Company, Fort Wayne, Ind.

[22] Filed: Aug. 28, 1969

[21] Appl. No.: 853,844

[52] U.S. Cl. ....................315/22, 323/22 T
[51] Int. Cl. ....................H01j 29/52, G05f 1/56
[58] Field of Search....................315/22; 323/22 T

[56] References Cited

UNITED STATES PATENTS 3,395,311 7/1968 Hursh ....................315/22
2,854,592 9/1958 Ruth ....................315/22 X
3,430,096 2/1969 Hansen et al. ....................315/22

*Primary Examiner*—T. H. Tubbesing
*Attorney*—Pendleton, Neuman, Williams & Anderson

[57] ABSTRACT

A circuit is disclosed for maintaining a constant accelerating anode voltage over a wide range of beam currents in a cathode-ray tube by regulating the peak value of the horizontal retrace signal used to generate the accelerating voltage. A diode-capacitor clamp circuit coupled to the horizontal output stage is loaded by a variable resistance discharge path responsive through a sensing circuit to variations in beam current in the described embodiment.

12 Claims, 3 Drawing Figures

Inventors
Joseph G. Zaherer
George A. Kerrt
by: Pendleton, Neuman, Seibold & Williams
Att'ys Inventors
Joseph G. Zahrren
George A. Kerr
Pendleton, Neuman
by Seibold & Williams
Att'y's

TELEVISION HIGH-VOLTAGE REGULATOR CIRCUIT

BACKGROUND OF THE INVENTION

This invention relates to power supply regulating circuits and, more specifically, to circuits for regulating the high-voltages applied to the accelerating anodes of cathode-ray picture tubes in television receivers over a wide range of beam currents. While this invention will be subsequently described primarily in relation to a high-voltage regulator for television receivers, it may be used in any electrical circuit wherein a voltage output is developed from a series of relatively low-voltage pulses through an inductive reactor and, as will be apparent, is capable of much broader application.

In commercial television receivers, the source of the high-voltage required at the accelerating anode of the picture tube has usually been a tertiary, high-voltage step-up winding on the horizontal output transformer feeding a simple diode rectifier or voltage multiplier. Various circuits for regulating the high-voltages thus produced have heretofore been proposed, but they have had many disadvantages associated therewith. Most often such circuits were associated directly with the high-voltage side of the circuit and thus had to be capable of withstanding the high-voltages produced, normally 15 to 30 kilovolts, and any temporary transient overvoltages which might occur. These circuits often included devices which were sources of X-ray radiation. The regulation of many such prior circuits was dependent on the tuning of the horizontal output stage. The prior circuits normally provided no protection for the horizontal output stage against high-voltage spikes caused by arcs in the picture tube.

SUMMARY OF THE INVENTION

This invention provides circuitry for regulating the magnitude of a high-voltage inductively developed from a series of low-voltage pulses varying the magnitude of those pulses. More specifically, this invention provides circuitry for regulating the high-voltage applied to the accelerating electrode in the picture tube of a television receiver by varying the magnitude of the horizontal retrace pulses used to develop that high-voltage. Still more specifically, this invention provides such television high-voltage-regulating circuitry wherein a signal indicative of the picture tube beam current is used to vary the resistance of a variable resistance path loading a clamp circuit coupled to the horizontal output stage.

Accordingly, it is an object of this invention to provide a circuit for regulating a high-voltage by varying the magnitude of the signal used to develop that voltage.

It is an object of this invention to provide a high-voltage-regulating circuit in television receivers associated with the horizontal output stage.

It is an object of this invention to provide a high-voltage-regulating circuit in television receivers which varies the magnitude of the horizontal retrace signals used to develop that voltage.

It is an object of this invention to provide a circuit in television receivers responsive to variations in picture tube beam current for regulating the magnitude of the horizontal retrace signals used to develop the picture tube high-voltage in response to such variations.

It is an object of this invention to provide a clamping circuit with a load having an impedance variable in response to changes in beam current for regulating the picture tube high-voltage in a television circuit.

It is an object of this invention to provide a television high-voltage regulator circuit comprising relatively low voltage devices.

It is an object of this invention to provide a television high-voltage regulator circuit which controls the emission of X-rays or other secondary radiation.

It is an object of this invention to provide a television high-voltage regulator circuit which is unaffected by the tuning of the horizontal output stage.

It is an object of this invention to provide a television high-voltage regulator circuit which provides protection of the horizontal output stage from high-voltage spikes.

It is an object of this invention to provide a television high-voltage regulator circuit characterized by a high degree of regulation, simplicity of design, and economy of construction.

Further and additional objects will appear from the description, accompany drawings, and appended claims.

DESCRIPTION OF THE PREFERRED EMBODIMENT

Figures 1, 3:
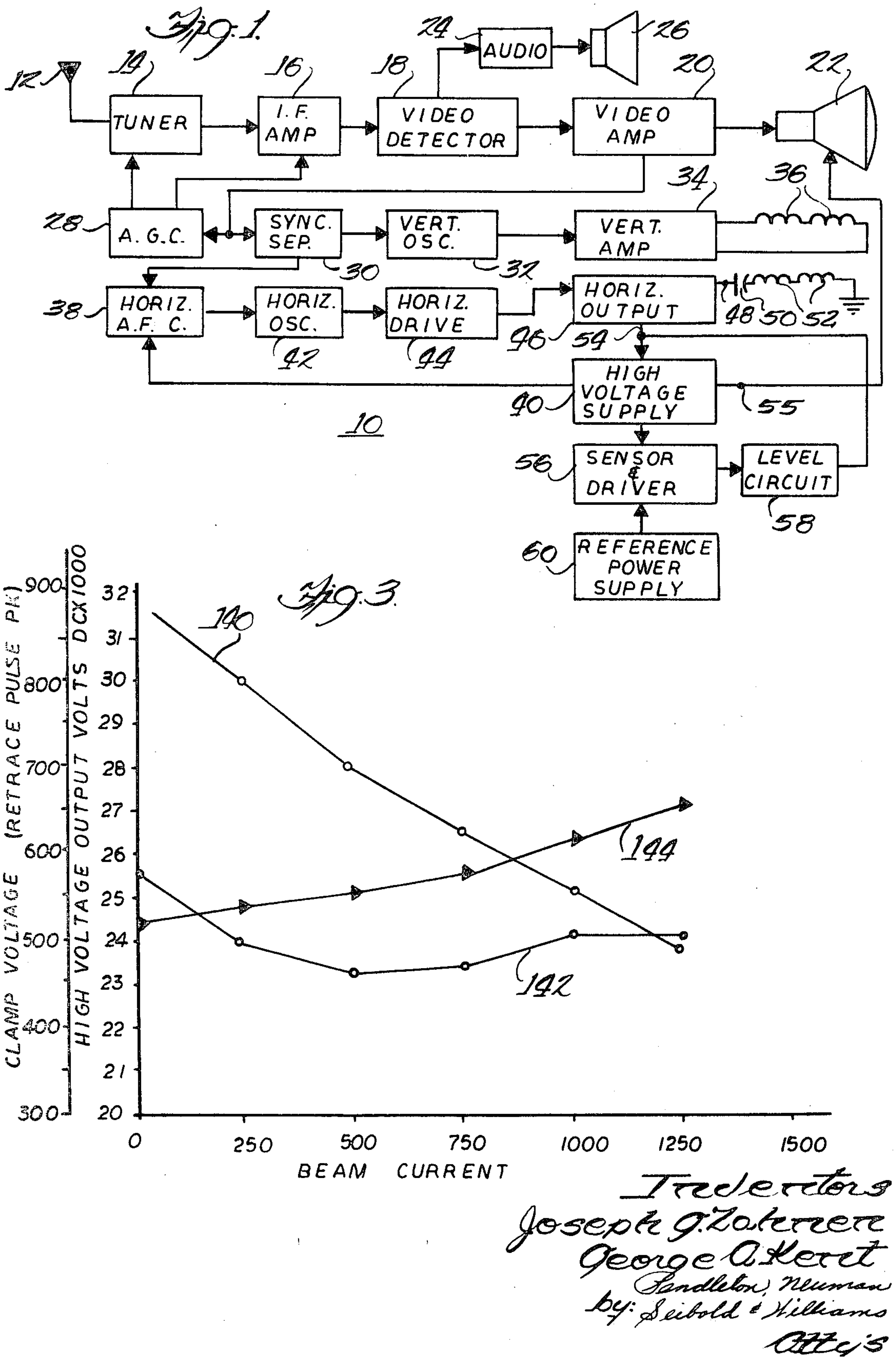
FIG. 1 is a block diagram of a television receiver incorporating one embodiment of this invention.
FIG. 3 is a graph showing the characteristics of the voltage regulator of FIG. 2.

A television receiver 10 incorporating a preferred embodiment of this invention is disclosed in FIG. 1. Although the general mode of operation of the receiver is conventional, it will be briefly described in order that this invention might be more fully understood.

An antenna 12 is coupled to a radio frequency input of a tuner 14 which selects the desired received television signal, converts it into an intermediate frequency signal, and applies the IF signal to an IF amplifier 16 which then amplifies it. A video detector 18 is coupled to an output of IF amplifier 16 and recovers the video information from the IF signal and applies it through a video amplifier 20 to a cathode-ray picture tube 22. Audio stage 24 is coupled to an output of video detector 18; it detects the intercarrier audio signal, amplifies it, and applies it to a sound reproducer such as a speaker 26.

An output from video amplifier 20 is applied to inputs of an automatic gain control circuit 28 and a synchronizing signal separator circuit 30. AGC circuit 28 is connected to tuner 14 and IF amplifier 16 and controls their amplification to maintain the signal applied to video amplifier 20 at a substantially constant level regardless of wide variations in received signal strength. Sync. separator 30 develops a vertical synchronization signal which is used to control the operation of a vertical oscillator 32. The vertical oscillator generates a vertical deflection signal which is applied through a vertical amplifier 34 to a pair of vertical deflection windings 36 arranged to control the vertical position of the electron beam in picture tube 22.

The sync. separator 30 also develops a horizontal synchronization signal which, in addition to a flyback signal from a high-voltage supply 40, is applied to a horizontal automatic frequency control circuit 38. The AFC circuit compares the flyback and horizontal synchronization signals and regulates the operation of a horizontal oscillator 42. The horizontal oscillator develops a horizontal deflection signal which is coupled through a horizontal driver stage 44 to a horizontal output stage 46. A first output 48 of horizontal output stage 46 is coupled through a capacitor 50 and a pair of horizontal deflection windings 52 to a common ground connection. Horizontal deflection windings 52 are arranged to control the horizontal position of the electron beam in picture tube 22. A second output 54 of horizontal output stage 46 comprised of the pulsed, horizontal retrace signal is coupled to high-voltage supply 40. Supply 40 develops an unregulated high-voltage, DC signal from the horizontal retrace signal at an output 55. That high-voltage is applied to an accelerating anode, or ultor, in picture tube 22 to accelerate the electron beam.

In accord with the principles of this invention, a sensor and driver stage 56 may be coupled to output 54 of horizontal output stage 46. The sensor and driver develops an output signal related to the amount of beam current flowing in picture tube 22, i.e., the amount of current flowing in the output 55 of high-voltage supply 40. That output signal is applied to a level circuit 58. The level circuit is additionally coupled to the second output 54 of the horizontal output stage 46; it varies the level, which may be the peak level or the r.m.s. level, of the retrace pulses applied to high-voltage supply 40 in response to the signal applied from the sensor and driver 56.

Sensor and driver 56 and level circuit 58 cooperate so that when beam current is low, a relatively low voltage retrace signal is applied to the high voltage supply 40, but when beam current is high, a relatively high-voltage retrace signal is applied to the high-voltage supply 40 to compensate for circuit loses. The output of supply 40 is thus maintained at a substantially constant voltage regardless of variations in beam current. Such regulation is required because of the relatively high effective output impedances of the high-voltage supplies used in television receivers, often 10 to 15 megohms. A reference power supply 60 may deliver a regulated voltage to the sensor and driver stage 56 to reduce the required voltage rating of the components used therein, as will be explained in more detail subsequently.

Figure 2:
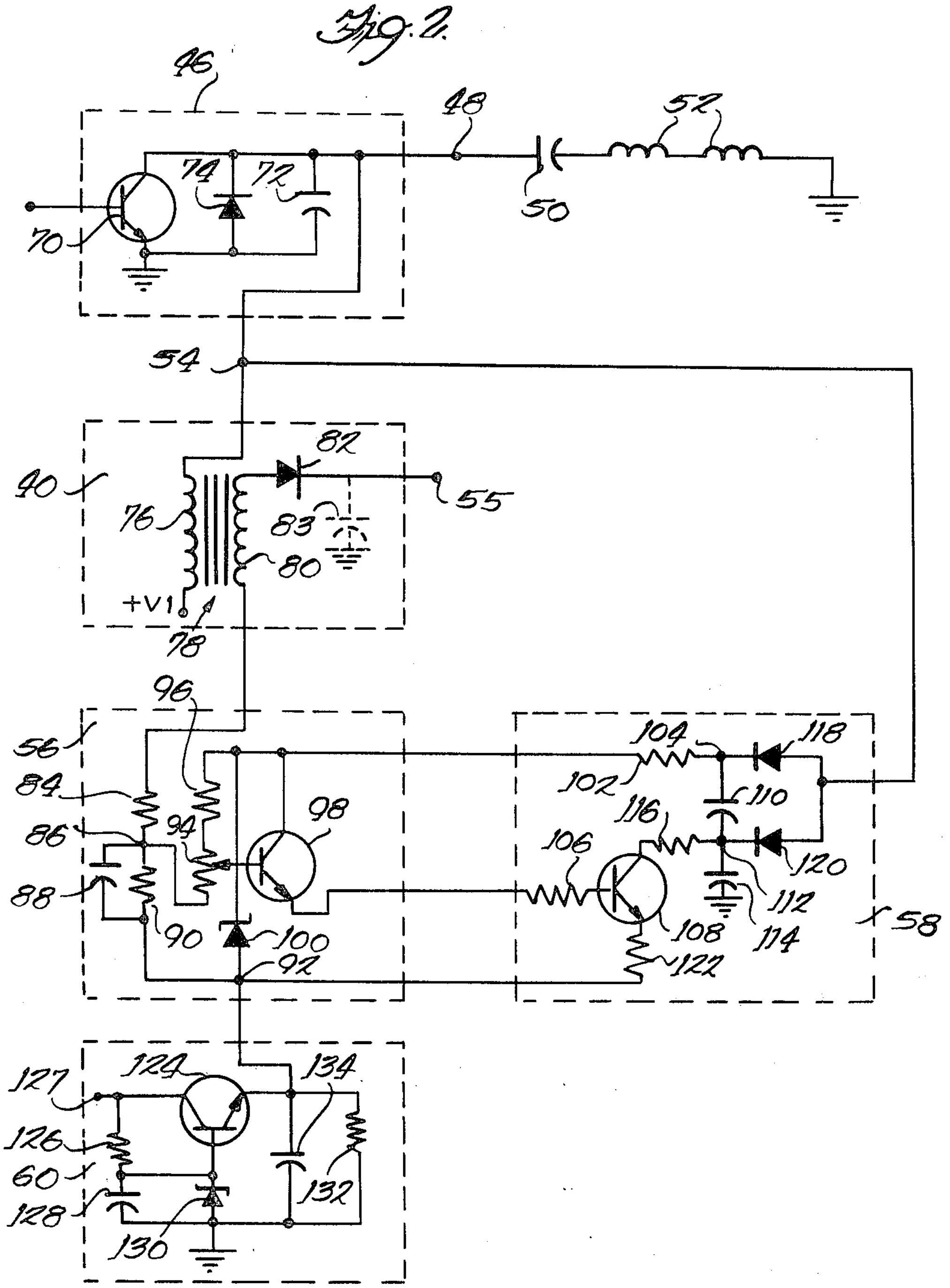
FIG. 2 is a schematic diagram of the voltage regulator of FIG. 1 and its associated circuitry.

FIG. 2 is a schematic drawing of a sensor and driver stage 56 and a level circuit 58 in accordance with this invention. A schematic drawing of a reference power supply 60 and partial schematic drawings of a high-voltage supply 40 and a horizontal output stage 46 are also shown. The output of horizontal driver stage 44 is applied to the base of an NPN-transistor 70 is horizontal output stage 46. The emitter of that transistor is connected to ground; the collector is coupled to output terminal 48, to ground through the parallel combination of a capacitor 72 and a diode 74, the diode being so oriented that its direction of high positive conductivity is away from ground, and to a source of positive voltage V1 through a primary winding 76 on a flyback transformer 78 in high voltage supply 40. Transistor 70 is biased to operate class C by suitable components, not shown, as is conventional.

A first end of a high-voltage winding 80 on transformer 78 is coupled through a diode 82 to output 55 of high voltage supply 40. The diode is oriented so that its direction of high positive conductivity is toward output 55. An effective capacitance, indicated dashed at 83 in FIG. 2, appears between the high-voltage output and ground. It may be the capacitance of the picture tube 22 itself and is adequate to filter the high-voltage high-impedance output. As thus far described, the horizontal output stage and high-voltage supply are conventional.

In accord with this invention, however, a second end of high-voltage winding 80 is connected to the input of sensor and driver stage 56 and thence through a resistor 84 to a circuit point 86. Circuit point 86 is coupled through the parallel combination of a capacitor 88 and a resistor 90 to another circuit point 92 and through the series combination of the resistive element of a potentiometer 94 and a resistor 96 to the collector of an NPN-transistor 98. A zener diode 100 is coupled between that collector and circuit point 92 and is oriented so that the direction of high positive conductivity is away from circuit point 92. The wiper arm of potentiometer 94 is connected to the base of transistor 98.

The collector of transistor 98 is also coupled through a resistor 102 to a circuit point 104 in level circuit 58. The emitter of transistor 98 is coupled through a resistor 106 to the base of an NPN-transistor 108 in level circuit 58. Circuit point 104 is coupled through a capacitor 110 to a circuit point 112 and thence both to ground through a capacitor 114 and to the collector of transistor 108 through a resistor 116. Output 54 of horizontal output stage 46 is coupled through a diode 118 to circuit point 104 and a diode 120 to circuit point 112. Both diodes are oriented so that their direction of high positive conductivity is away from output 54. A resistor 122 is connected between the emitter of transistor 108 and circuit point 92. Circuit point 92 is connected to the output of reference power supply 60 and is maintained at a constant DC potential.

The reference power supply 60 comprises in part an NPN-transistor 124 connected as a series regulator. A source of unregulated DC voltage, not shown, is connected at input 127 to the collector of transistor 124 which is, in turn, coupled to the base of transistor 124 through a resistor 126. The base is coupled to ground through the parallel combination of a capacitor 128 and a zener diode 130, the diode being oriented so that its direction of high positive conductivity is away from ground; the emitter is coupled to ground through the parallel combination of an output resistor 132 and a filter capacitor 134 and directly to circuit point 92 in the sensor and driver 56. The reference power supply may, where appropriate, be replaced by an existing source of regulated voltage within the equipment.

In the operation of the circuit as described, positive horizontal retrace pulses from output 54 of horizontal output stage 46 are applied to a first clamp circuit comprised of diode 120 and capacitor 114. If operated as a conventional clamping circuit, circuit point 112 would be held at a voltage approximately equal to the maximum voltage of the horizontal retrace pulses at output 54 and the clamping circuit would have relatively little effect on the retrace pulses applied to high-voltage supply 40 from horizontal output circuit 46. However, the clamping circuit is loaded by a variable impedance load circuit here comprising resistors 116 and 122 and the collector-emitter circuit of transistor 108. When the impedance of that load circuit is relatively high, capacitor 114 will discharge slowly and the clamp circuit will operate in the conventional manner described. When, however, the impedance of the load circuit is relatively low, capacitor 114 will discharge rapidly through it and circuit point 112 will not reach the maximum value of the applied horizontal retrace pulses. When the voltage at output 54 tends to exceed that at circuit point 112, diode 120 will be forward-biased and the signal at output 54 will be clipped to a value determined by the voltage at circuit point 112. The combination of the clamp circuit and the variable impedance load circuit then clamp the magnitude of the horizontal retrace pulses applied to winding 76 on flyback transformer 78 to a value determined by the impedance of the load circuit.

A second clamp circuit comprised of diode 118 and capacitor 110 supplies a source of DC power through regulating resistor 102 to transistor 98 in sensing and driver circuit 56. Zener diode 100 cooperates with resistor 102 to maintain the collector of transistor 98 at a fixed potential, determined by its reverse breakdown voltage, with respect to circuit point 92.

The beam current from cathode-ray tube 22 flows through high-voltage secondary-winding 80 and through resistor 84. Resistors 84, 90, and 96, potentiometer 94, and the fixed potential maintained by zener diode 100 cooperate to form a sensing network which develops a signal indicative of the magnitude of the beam current. Under zero anode current conditions, the voltage across resistor 90 and capacitor 88 is as indicated and a positive signal is applied to the base of transistor 98. Increased anode current in transformer 78 causes point 86 to become less positive. The signal thus developed at the wiper arm of potentiometer 94 as a result of anode current in transformer 78 is a voltage which becomes less positive with increased beam current and thus is inversely related to the magnitude of the beam current. This signal is applied to the base of transistor 98, causing transistor 98 to become less conductive for increased beam current. Potentiometer 94 may be used to adjust the constant of proportionality. Capacitor 88 filters the DC voltage appearing across resistor 90. Transistor 98 serves as a driver for transistor 108.

Thus as the beam current through cathode-ray tube 22 increases, the voltage at the base of transistor 98 decreases, the base bias current for transistor 108 flowing through transistor 98 decreases, transistor 108 is driven toward cutoff, the collector-emitter impedance of transistor 108 and thus the impedance of the variable impedance load circuit increases, and the horizontal retrace pulses at output terminal 54 are clamped to a high level. Conversely, when the beam current decreases, the sensed voltage at the base of transistor 98 increases, more base bias current for transistor 108 flows through transistor 98, transistor 108 is driven towards saturation, the collector-emitter impedance of transistor 108 and thus the impedance of the variable impedance load circuit decreases, and the horizontal retrace pulses at output terminal 54 are clipped to a low level.

Reference power supply 60 maintains a fixed reference voltage for operation of the sensor and driver circuit 56 and level circuit 58. By using a voltage above ground rather than the common ground as a reference for these circuits, devices having lower voltage ratings may be used. An advantage of this circuit is that it permits the use of low-voltage components for transistor 98 and zener diode 100 which are readily and economically available. Reference power supply 60 could be eliminated and circuit point 92 tied directly to ground if inexpensive high-voltage components were available.

In the circuit shown in FIG. 2, output 48 to the horizontal deflection windings and output 54 to the high-voltage supply 40 from horizontal output stage 46 are tied together. In some applications of this invention is may be desirable to isolate those outputs so the regulator circuit would not effect the magnitude of the sweep signal applied to windings 52. Further, it should be noted that if a high-voltage positive spike from picture tube 22, as may be caused by arcing in the picture tube, is induced through transformer 78 into primary winding 76, it will flow through diode 120 to ground and will not adversely effect transistor 70 and diode 74 in the horizontal output stage.

A graph showing the operation of one application of the described embodiment is shown in FIG. 3. Beam current in microamperes is represented on the horizontal axis, the voltage at output 55 of high-voltage supply 40 is represented on the right-hand vertical axis, and the clamp voltage at circuit point 112 indicating the peak value of the horizontal retrace pulses developed at output 54 of horizontal output stage 46 is represented on the left-hand vertical axis. Line 140 shows voltage versus beam current at output 55 with the regulator circuit of this invention disconnected; line 142 shows the same relationship with the regulator connected. Line 144 is representative of the clamp voltage at circuit point 112 versus beam current with the regulator connected. There is thus shown the manner in which the clamp voltage increases with increased beam current and the resultant regulation achieved in the high-voltage output.

It will be seen that certain modifications of the specific embodiment shown may be made without departing from the spirit and scope of this invention. For example, any number of equivalent circuits might be substituted for the clamp circuit of capacitor 114 and the diode 120. A variety of circuits might be used to develop a signal related to the magnitude of the picture tube beam current. Numerous circuits responsive to that signal might be used to vary the clamping level. Circuits might be constructed to vary the r.m.s. level rather than the peak level of the applied horizontal retrace pulses. Further, circuits of this invention are of much broader application than the regulation of high-voltages in television receivers.

It will thus be seen that a voltage-regulating circuit has been provided which fulfills all of the above-named objects. While a particular embodiment of this invention is shown above, it will be understood, of course, that the invention is not to be limited thereto since many modifications may be made. It is contemplated, therefore, by the appended claims, to cover any such modifications as fall within the true spirit and scope of this invention.

We claim:

1. A voltage regulator circuit for use with a voltage-generating circuit and a source of electrical pulses, said voltage-generating circuit producing a unidirectional voltage at an output in response to a series of pulses applied to it from said pulse source, and comprising sensing means coupled to said voltage-generating circuit for producing a signal related to the output current of said generating circuit, a clamp circuit coupled to said pulse source and clamping the pulses applied to said voltage-generating circuit at a predetermined level, and variable impedance load circuit means coupled to said clamp circuit and said sensing means for varying said predetermined level in response to said signal.

2. The voltage regulator circuit of claim 1 wherein said clamp circuit comprises a unidirectionally conductive element and a capacitive element coupled in series arrangement between said pulse source and a point of reference potential.

3. The voltage regulator circuit of claim 2 wherein said variable impedance load circuit means comprises a variable resistance path coupled in parallel arrangement with said capacitive circuit element.

4. A television high-voltage regulator circuit for use with a high-voltage-generating circuit producing a unidirectional high-voltage at an output in response to a series of electrical pulses applied to it from a pulse source, said voltage regulator circuit comprising sensing circuit means coupled to said voltage-generating circuit for producing a signal related to the output current of said generating circuit, a clamp circuit coupled to said pulse source and clamping the pulses applied to said voltage-generating circuit at a predetermined level, and variable circuit means coupled to said clamp circuit and said sensing means for varying said predetermined level in response to said signal.

5. The television high-voltage regulator circuit of claim 4 wherein said clamp circuit comprises a unidirectionally conductive circuit element and a capacitive circuit element coupled in series relationship between said pulse source and a point of reference potential and said variable circuit means comprises a variable resistance path coupled in parallel relationship with said capacitive circuit element.

6. The television high-voltage regulator circuit of claim 5 wherein said variable resistance path comprises the collector-emitter circuit of a transistor and the base emitter circuit of said transistor is coupled to said sensing circuit means and forward biased in accord with said signal.

7. A television circuit comprising:

a source of horizontal retrace pulses;

a high-voltage generator coupled to said source;

sensing means coupled to said high-voltage generator for producing a signal related to the output current of said generator;

clamping means coupled to said source for holding the peak value of said horizontal retrace pulses at a predetermined level; and variable impedance means coupled to said sensing means and said clamping means for varying said predetermined level in response to changes in said signal.

8. The television circuit of claim 7 wherein said clamping means comprises a unidirectionally conductive circuit element and a capacitive circuit element coupled in series relationship between said source and a first point of reference potential.

9. The television circuit of claim 8 wherein said variable impedance means comprises a variable resistance path coupled in parallel relationship with said capacitive circuit element.

10. The television circuit of claim 9 wherein said television circuit further comprises a circuit ground and said variable resistance path is coupled to a second point of reference potential at a voltage higher than said circuit ground.

11. The television circuit of claim 10 further comprising a regulated voltage supply maintaining said second point of reference potential at said higher voltage.

12. The television circuit of claim 9 wherein said variable resistance path comprises the collector emitter circuit of a transistor and the base-emitter circuit of said transistor is coupled to said sensing circuit means and biased in accord with said signal.

* * * * *